(12) United States Patent
Maillon et al.

(10) Patent No.: US 8,678,448 B2
(45) Date of Patent: Mar. 25, 2014

(54) THREADED CONNECTION

(75) Inventors: Bertrand Maillon, Saint-Etienne (FR);
Pierre Martin, Valenciennes (FR);
Jerome Durivault, Paris (FR)

(73) Assignees: Vallourec Mannesmann Oil & Gas France, Aulnoye-Aymeries (FR);
Sumitomo Metal Industries, Ltd., Osaka-shi (JP)

( * ) Notice: Subject to any disclaimer, the term of this patent is extended or adjusted under 35 U.S.C. 154(b) by 44 days.

(21) Appl. No.: 13/512,444

(22) PCT Filed: Nov. 26, 2010

(86) PCT No.: PCT/EP2010/007191
§ 371 (c)(1),
(2), (4) Date: May 29, 2012

(87) PCT Pub. No.: WO2011/063976
PCT Pub. Date: Jun. 3, 2011

(65) Prior Publication Data
US 2012/0286507 A1 Nov. 15, 2012

(30) Foreign Application Priority Data
Nov. 30, 2009 (FR) .................................... 09 05756

(51) Int. Cl.
*F16L 25/00* (2006.01)
(52) U.S. Cl.
USPC ........................................................ 285/334
(58) Field of Classification Search
USPC ................................................ 285/333, 334
See application file for complete search history.

(56) References Cited

U.S. PATENT DOCUMENTS

| 4,600,224 | A | * | 7/1986 | Blose | 285/334 |
| 4,600,225 | A | * | 7/1986 | Blose | 285/334 |
| 5,462,315 | A | * | 10/1995 | Klementich | 285/334 |
| 6,722,706 | B2 | * | 4/2004 | Church | 285/334 |
| 7,690,697 | B2 | * | 4/2010 | Church | 285/334 |
| 8,267,436 | B2 | * | 9/2012 | Church | 285/334 |
| 2004/0049196 | A1 | | 3/2004 | Jackson | |

(Continued)

FOREIGN PATENT DOCUMENTS

WO 2004 021900 3/2004

OTHER PUBLICATIONS

U.S. Appl. No. 13/510,697, filed May 18, 2012, Martin, et al.

(Continued)

*Primary Examiner* — David E Bochna
(74) *Attorney, Agent, or Firm* — Oblon, Spivak, McClelland, Maier & Neustadt, L.L.P.

(57) ABSTRACT

A threaded connection used in exploration and operation of hydrocarbon wells includes first and second tubular components, including respective male and female ends and threaded zones. The threaded zones include respective male and female threads, the threads including a root, a crest, a stabbing flank, and a load flank. A groove is provided in the load flank of the threaded zone of the female end and/or the male end respectively, adjacent to the root, and a boss projects axially from the load flank of the threaded zone of the male end and/or respectively from the female end adjacent to the crest, the boss including a convex and concave surfaces. The boss is housed in the groove with, in a connected state, a radial clearance between the concave surface and the groove and an axial clearance between the end of the boss and the bottom of the groove.

20 Claims, 2 Drawing Sheets

(56) References Cited

U.S. PATENT DOCUMENTS

| | | |
|---|---|---|
| 2004/0199164 A1 | 10/2004 | Jackson |
| 2005/0285398 A1* | 12/2005 | Sivley, IV .................... 285/334 |
| 2007/0063517 A1 | 3/2007 | Pallini, Jr. et al. |
| 2008/0277933 A1 | 11/2008 | Church |
| 2009/0250927 A1 | 10/2009 | Pallini, Jr. et al. |
| 2009/0259259 A1 | 10/2009 | Jackson |
| 2011/0133448 A1* | 6/2011 | Williams et al. ............... 285/333 |
| 2012/0025522 A1* | 2/2012 | Granger et al. ............... 285/333 |

OTHER PUBLICATIONS

International Search Report Issued Oct. 24, 2011 in PCT/EP10/007191 Filed Nov. 26, 2010.

* cited by examiner

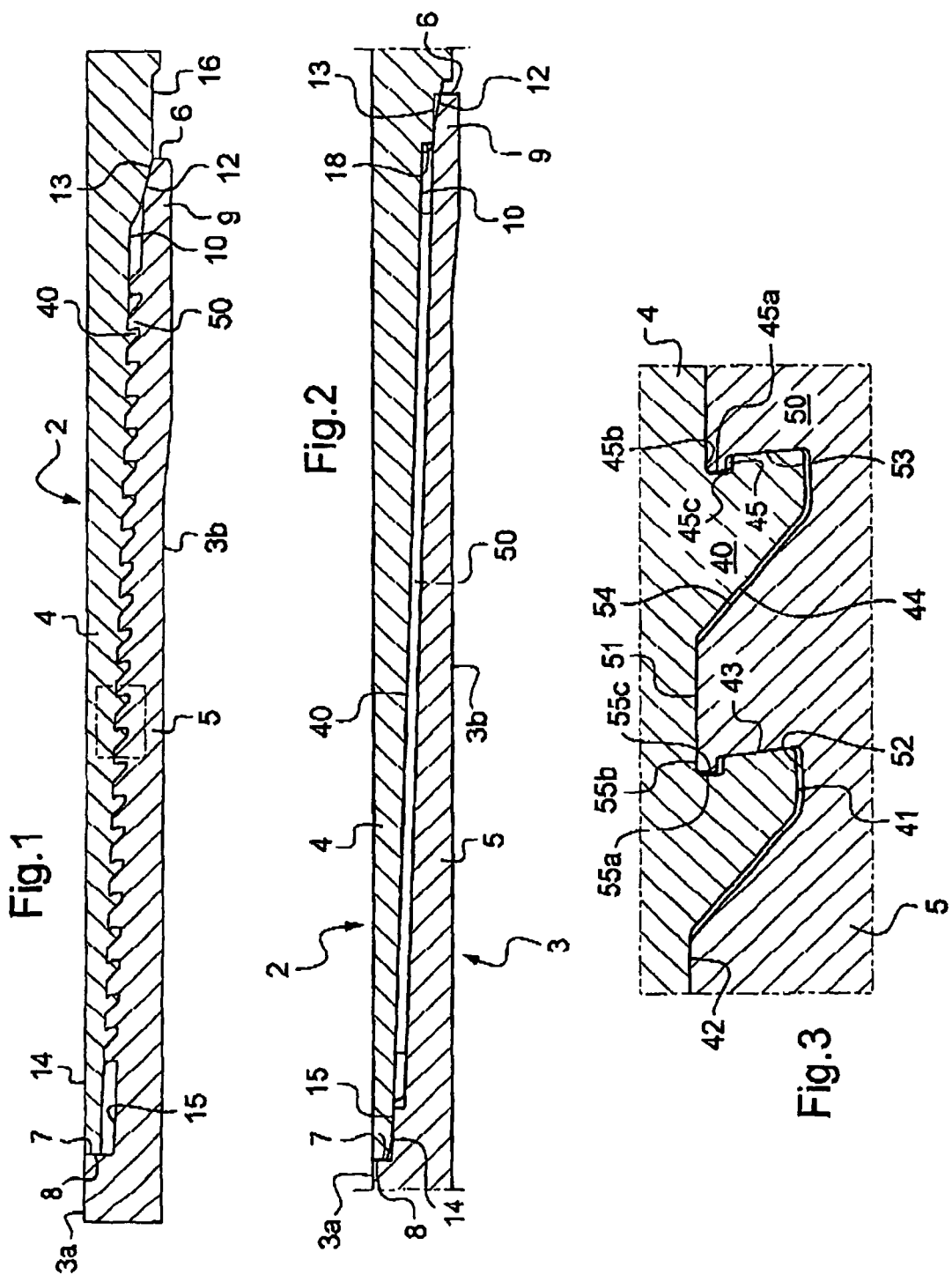

THREADED CONNECTION

BACKGROUND OF THE INVENTION

The invention relates to the field of tight connections for tubular components, used in particular for drilling or the operation of hydrocarbon wells. During drilling or operation, the connections are subjected to large compressive and tensile stresses and must not come apart.

Such connections are subjected to axial tensile or compressive stresses, to internal or external fluid pressure stresses, to bending or even torsional stresses, possibly combined and with an intensity which may fluctuate. The tightness must subsist despite the stresses and despite harsh on-site conditions of use. Threaded connections must be able to be made up and broken out several times without their performance degrading, in particular by galling. After breakout, the tubular components may be re-used under other conditions of service.

Under tension, a phenomenon termed jump-out may occur and be propagated from one thread to another, risking that the connection will come apart. That phenomenon is facilitated by a high internal pressure.

BRIEF SUMMARY OF THE INVENTION

The invention proposes an improved connection as regards its tensile behaviour for the exploration or operation of hydrocarbon wells. The threaded connection comprises a first and a second tubular component. The first component comprises a male end comprising a threaded zone disposed on its external peripheral surface. The second component comprises a female end comprising a threaded zone disposed on its internal peripheral surface. The threaded zone of the male end is made up into the threaded zone of the female end. The threaded zones comprise respective male and female threads. The threads comprise a root, a crest, a stabbing flank and a load flank. A groove is provided in the load flank of the threaded zone of the female end, and/or respectively the male end, adjacent to the root. A boss is provided which projects axially from the load flank of the threaded zone of the male end and/or respectively the female end, adjacent to the crest. The boss comprises a convex surface and a concave surface. The boss is housed in the groove with, in the connected state, a radial clearance subsisting between the concave surface and the groove. An axial clearance subsists in the connected state between the end of the boss and the bottom of the groove.

A distal surface of the male end and/or the female end may be brought into axially abutting contact against a corresponding abutment surface.

The boss may be helically continuous or discontinuous. The threads may have a constant axial dimension. In the connected state an axial clearance may subsist between the stabbing flanks of the male and female threads. The axial clearance between the stabbing flanks may be in the range 0.05 mm to 1 mm in the connected state.

The axial clearance between the end of the boss and the bottom of the groove may be in the range 0.011 mm to 2 mm in the connected state.

The radial clearance between the concave surface of the boss and the groove may be in the range 0.005 mm to 2 mm in the connected state.

The axial dimension of the threads may vary.

The radial clearance between the crest of the threaded zone of the female end and the root of the threaded zone of the male end and/or between the crest of the threaded zone of the male end and the root of the threaded zone of the female end may be in the range 0.05 mm to 0.5 mm, preferably less than 0.2 mm, in the connected state. A diametrical interference may be provided between the crest of the threaded zone of the female end and the root of the threaded zone of the male end, or between the crest of the threaded zone of the male end and the root of the threaded zone of the female end.

The axial clearance between the stabbing flanks may be in the range 0.05 mm to 2 mm in the connected state.

The large diameter axial surface of the boss may be aligned with the crest of the threaded zone of the male end.

The crest of the threaded zone of the male end may be substantially axial or tapered. The root of the threaded zone of the male end may be substantially axial or tapered. The crest of the threaded zone of the female end may be substantially axial or tapered. The root of the threaded zone of the female end may be substantially axial or tapered.

The stabbing flank of the threaded zone of the female end may comprise a positively inclined rectilinear portion at an angle in the range 10° to 35°, preferably in the range 15° to 25°. The stabbing flank of the threaded zone of the male end may comprise a positively inclined rectilinear portion at an angle in the range 10° to 35°, preferably in the range 15° to 25°. The load flank of the threaded zone of the male and female ends may comprise a negatively inclined rectilinear portion at an angle in the range 3° to 15°, preferably in the range 3° to 5°.

The axial length of the boss may be in the range 0.1 mm to 1 mm, preferably in the range 0.2 mm to 0.4 mm. The axial length of the boss may be in the range 50% to 150% of the radial height of the boss, preferably in the range 80% to 120%. The radial height of the boss may be in the range 0.1 mm to 1.5 mm, preferably in the range 0.2 mm to 0.5 mm. The radial height of the boss may be in the range 5% to 45% of the radial height of the thread, preferably in the range 10% to 30%. The end of the boss may be substantially radial. The diameter of the threads may vary.

The external diameter of the tubular component may be more than 250 mm, preferably more than 350 mm. The tubular component may be a casing.

The distal surface of the male end and/or the female end may be brought into axial abutting contact against a corresponding abutment surface.

The male and female ends may each comprise a sealing surface capable of cooperating with one another by tightening in a metal/metal seal.

The term "threading-up" means the operation of relative rotation and translation of one component with respect to the other with mutual engagement of threaded zones. The term "connection" or "makeup" means an operation which follows threading-up, continuing the relative rotation and translation, resulting in a given makeup torque between the two components. This is the connected state. The angle of the flanks is measured in the clockwise direction with respect to a radial plane passing through the base of the flanks at the level of the fillet radius connecting with the root.

BRIEF DESCRIPTION OF THE SEVERAL VIEWS OF THE DRAWINGS

Further characteristics and advantages of the invention will become apparent from the following detailed description and accompanying drawings in which:

FIG. 1 diagrammatically shows a first threaded connection in longitudinal section;

FIG. 2 diagrammatically shows a second threaded connection in longitudinal section;

FIGS. 3 to 5 diagrammatically show examples of threaded zones of the connection in a longitudinal sectional half-view.

DETAILED DESCRIPTION OF THE INVENTION

Figure 4:
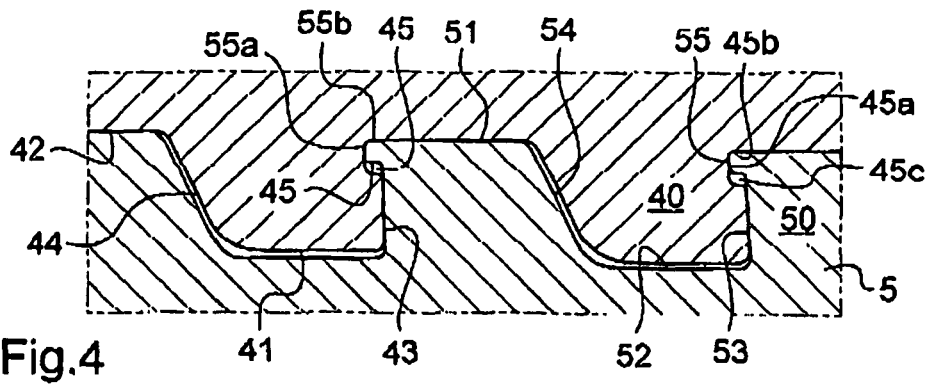

The accompanying drawings may not only serve to complete the invention but also, if necessary, to contribute to its definition.

In order to improve connections, the Applicant has developed superior connections, termed premium connections, which exceed API standards. As an option, sealing surfaces may be provided adjacent to the threaded zones, said surfaces being brought into interfering contact when threading-up the components.

The threaded zones are provided at the end of each of the male and female tubular components. The female tubular component may be a great length tube or, in contrast, a short coupling type tube. The tightness to fluid (liquid or gas) under high pressure thus results from bringing the sealing surfaces into mutual radially interfering contact. The intensity of the radial interference is a function of the relative axial positioning of the male and female threaded zones, said relative positioning being determined, for example, by contact of the abutment surfaces provided respectively on the male and female ends.

Since relative positioning results from contact of the abutments, abutment surfaces are provided on the internal surface of the connection. On its external periphery, the male end comprises a threaded zone extended by a sealing surface which is itself extended by a terminal portion finishing in an abutment surface which is orientated radially with respect to the axis of revolution of the connection. On its internal periphery, the female end comprises a threaded zone extended by a sealing surface which is itself extended by a terminal portion finishing in an abutment surface which is orientated radially with respect to the axis of revolution of the connection. The connection thus has a double abutment. Other connections have a single abutment, radially externally of the threaded zone or internally of the threaded zone.

The Applicant has particularly focussed on large diameter threaded connections with a diameter of more than 300 mm, more particularly more than 375 mm. Such connections are occasionally subjected to intense tensile and compressive loads. Thus, good performance of the connection under tension and in compression is desirable. When the tensile load is excessive, the threads can separate from each other by a disengaging phenomenon which causes the two components of the connection to separate. The consequences can be particularly annoying from a technical and cost viewpoint. This is particularly the case when the threading has a tapered generatrix; jump-out of a thread can cause the connection to come apart completely.

U.S. Pat. No. 4,822,081 describes a threading for male and female connections used in oil exploration tubes. The threads are of the self-locking type with contact between the flanks when the shoulders and the end surfaces are just in contact. The abutment surfaces are tapered at different angles. The threads are also self-clinching in the radial direction. That type of self-locking and self-clinching threaded connection necessitates a very high makeup torque which is difficult to achieve for large diameter tubes. The free volume in the threading is very low, and so threading-up may cause the grease to come under a high pressure, which may cause leaks. The axial positions of the abutment surfaces with respect to the threads being uncertain because of industrial tolerances, there may result a poor positioning of the sealing surfaces and consequently a leak. The end of the threading-up operation is barely capable of being detected by determination of an upper limit to the torque, due to the absence of a positive abutment during threading-up. The abutments are reached during final makeup. An excessive threading-up torque may result in plastic deformation of the sealing surfaces, which deleteriously affects the seal of the connection.

The document U.S. Pat. No. 5,462,315 describes a tubular connection with a central seal between two portions of the threading. The load flanks of the threads are in mutual contact after makeup. The disadvantages are substantially the same as for the preceding type.

The documents US 2002/27363, EP-1 046 179 and EP-1 302 623 envisage contact of the thread flanks after makeup.

The document JP 2002/081584 discloses a thread profile with hook cooperation. Those hooks support all of the tensile loads and radial displacement loads, which may cause damage to the threads with repetitive, cyclic loads. The tensile loads must remain low due to the small surface area via which they are transmitted. The stabbing flanks are steeply inclined, which is deleterious to compressive strength. A high threading-up torque is necessary because of the interference between the thread crests and valleys.

The Applicant has developed a connection which greatly reduces the risk of jump-out independently of the position of the thread, at a low threading-up torque, which allows the bearing surfaces to be properly positioned and has sufficient space for grease. The threading has a variable thread width. An axial clearance between the stabbing flanks is present in the connected state, i.e. after makeup, and also there is a radial clearance present between the thread roots and crests. The load flanks of the threads are at a negative angle. The stabbing flanks of the threads are at a positive angle. An abutment allows proper positioning of the sealing surfaces.

As can be seen in FIG. 1, a threaded tubular connection 1 comprises a female end 2 and a male end 3. The female end 2 and/or the male end 3 may belong to a tube several meters in length, for example of the order of 10 to 15 meters long. One end, generally female, may constitute the end of a coupling, in other words a short-length tube enabling to connect together two great length tubes each provided with two male ends (threaded and coupled, T&C, connection). A coupling may be provided with two female ends. In a variation, a great length tube may be provided with one male end and one female end (integral threaded connection). The connection 1 is of the industrially mass produced type.

The connection 1 may be used to constitute casing strings or tubing for hydrocarbon wells, or work-over risers or drill-pipe strings for the same wells.

The tubes may be produced in different types of non-alloyed, low alloy or high alloy steel, or even in ferrous or non-ferrous alloys, which are heat treated or cold-worked depending on their service conditions, such as, for example: the level of mechanical stress, the corrosive nature of the fluid inside or outside the tubes, etc. It is also possible to use low corrosion resistance steel tubes coated with a protective coating, for example an alloy which is resistant to corrosion or a synthetic material.

The threaded female end 2 comprises a female threaded zone 4. The female threaded zone 4 is tapered, for example with a half-angle in the range 0.5° to 5°, preferably in the range 1° to 3°. The female threaded zone 4 is disposed on the inside of the female element 2. The male end 3 comprises a male threaded zone 5 disposed on an external surface of said male end 3. The male threaded zone 5 mates with the female threading 4. The male threaded zone 5 has a taper which is substantially equal to that of the female threaded zone 4.

On the side opposite to the abutment surfaces 7 and 8 with respect to the threaded zones 4 and 5, the male end 3 comprises a distal surface 6 which is substantially perpendicular to the axis 20 of the connection. The term "distal surface" means a surface situated between a threaded zone, continuous or discontinuous, and the free end of the element, male or female. A distal surface may be located at said free end. In this case, the distal surface 6 is terminal. The male threaded zone 5 extends to a distance from the terminal surface 6 sufficient to accommodate a sealing surface. In the connected state, the terminal surface 6 is separated from any optional substantially radial surface of the female end 2, in particular a shoulder, by at least 0.1 mm, for example.

The distal surface of the female end 2 is in the form of an annular surface, in this case substantially radial. The distal surface forms an axial abutment surface 8 which enables to limit relative axial movement between the female end 2 and the male end 3. The abutment surface 8 is in contact with a shoulder of the male end 3 also forming an abutment surface 7, in this case substantially radial. The abutment surface 8 may be radial or inclined at an angle of up to 45° with respect to a radial plane. The abutment surface 8 may have a tapered shape as in document EP-0 488 912, a toroidal shape as in document U.S. Pat. No. 3,870,351 or in WO-2007/017082, or multi-stage as in document U.S. Pat. No. 4,611,838, with a protuberance as in document U.S. Pat. No. 6,047,797, or a combination of those shapes. The reader is invited to refer to these documents. In the example illustrated in FIG. 1, the absolute angle is less than 1°. The abutment surfaces 7 and 8 of the female end 2 and male end 3 are disposed radially on the external side of the connection. The abutment surfaces 7 and 8 are disposed between the female 4 and male 5 threaded zones and the external surface of the connection 1.

Between the threaded zone 4 and the abutment surface 8, the female end 2 comprises a substantially tapered or cylindrical non-threaded surface 14 which is radially distant from a substantially tapered or cylindrical surface 15 of the male end 3 disposed between the threaded zone 5 and the abutment surface 7. The space left free between the surfaces 14 and 15 may act as a reservoir for grease when grease is expelled from between the threaded zones 4 and 5, on threading-up. These surfaces 14 and 15 allow the passage of a machining insert.

On the side of the threaded zone 4 opposite to the abutment surface 8, the female end 2 comprises a recess 10 and a surface of revolution 12. In FIG. 1, the recess 10 is in the form of a surface extending the thread root of the threaded zone 4. The recess 10 facilitates removal of the machining tool from the threaded zone 4. The recess 10 may act as a reservoir for grease when grease is expelled from between the threaded zones 4 and 5, on threading-up. The recess 10 may have a shape with the same taper as the thread root of the threaded zone 4. The surface of revolution 12 extends the recess 10 in the direction opposite to the abutment surface 8. The surface of revolution 12 has a decreasing diameter in the direction opposite to the abutment surface 8. The surface of revolution 12 may be tapered. In the present case, the surface of revolution 12 is domed in a circular or elliptical arc in section in an axial plane. The radius of the circular or elliptical arc may be in the range 8 mm to 25 mm. Beyond this, the female end 2 comprises a substantially cylindrical surface of revolution 16.

The male end 3 comprises a lip 9 extending axially beyond the male threaded zone 5 up to the distal terminal surface 6. The outside of the lip 9 comprises a non-threaded surface 11 extending the thread root of the threaded zone 5. The non-threaded surface 11 may have the same taper as the thread root of the threaded zone 5. Axially opposite to the threaded zone 5, the lip 9 externally comprises a surface of revolution 13. The surface of revolution 13 has an axial length which is slightly less than the axial length of the surface of revolution 12. A portion of the surface of revolution 13 and a portion of the surface of revolution 12 are in mutual radially interfering contact in the connected position of the connection 1 illustrated in the figures. The surfaces of revolution 12 and 13 forming the sealing surfaces enable to prevent the movement of fluid between the inside and the outside of the connection. In other embodiments, the surface of revolution 13 may be domed in a circular or elliptical arc and/or the surface of revolution 12 may be tapered.

The surface of revolution 13 here is substantially tapered. The angle of taper may be in the range 1° to 45°, preferably in the range 3° to 20°, for example 6°. The angle of taper of the surface of revolution 13 may be greater than the angle of taper of the threaded zones 4 and 5. The distal terminal surface 6 connects to the end of the surface of revolution 13 on the side opposite to the threaded zone 4. The connection comprises an axial abutment formed by the surfaces 7 and 8 which ensures precise positioning of the sealing zone formed by the surfaces of revolution 12 and 13 in the connected state.

The embodiment of FIG. 2 is similar to the preceding embodiment, with the exception that the surface of revolution 12 forming the seal is tapered, for example with a half-angle in the range 1° to 30°. The surface of revolution 13 forming the seal is tapered with a half-angle in the range 1° to 30°. The half-angle of the surface of revolution 13 is smaller than the half-angle of the surface of revolution 12. In known manner, the representation of the surfaces of revolution 12 and 13 is given as if interpenetration had taken place, in order to illustrate the diametrical interference. Clearly, the surfaces of revolution 12 and 13 deform slightly in the mutual contact zone. The surface of revolution 12 follows the recess 10 axially after a substantially radial shoulder 18.

A second sealing zone is provided axially between the abutment surfaces 7, 8 and the threaded zones 4, 5. The non-threaded internal surface 14 has a slightly domed form of revolution in axial section, for example a circular or elliptical arc. The internal surface 14 of the female end 2 is located in the extension of the thread roots 40. The external surface 15 of the male end 3 is located in the extension of the thread crests 50. The external surface 15 is tapered, for example with a half-angle in the range 1° to 45°. The internal 14 and external 15 surfaces are arranged to interfere diametrically.

The male end 3 comprises a sealing surface 15 adjacent to the abutment surface 7 and a sealing surface 13 distal to the abutment surface 7. The sealing surface 13 is in tight contact with the sealing surface 12 in the connected or made up state. The sealing surface 15 is disposed between the male threaded zone 5 and the external surface 3a of the male end 3. The sealing surface 15 is in tight contact with the sealing surface 14 in the connected or made up state.

The lip 9 of the male end 3 comprises a substantially radial terminal surface 6 extending between the sealing surface 15 and the bore 3b of the male end 3. The bore 3b may vary in diameter. This means that the surplus thickness provides for better contact pressure. The terminal surface 6 may have a radial dimension in the range 0.5 mm to 16 mm depending on the diameter of the tube which itself may be up to 550 mm, while preferably being more than 250 mm, more preferably 350 mm. In the connected state, the terminal surface 6 is distant from any substantially radial surface of the female end 2 by at least 0.1 mm, for example. The connection comprises an axial abutment which provides precise positioning of the two sealing zones formed by the sealing surfaces 12 and 13 on the one hand and 14 and 15 on the other hand in the connected state.

As can be seen in FIG. 3, the female threaded zone 4 comprises threads 40 with an axial length adjacent to the crest which is less than the axial length adjacent to the base. The male threaded zone 5 comprises threads 50 with an axial length adjacent to the crest which is greater than the axial length adjacent to the base. The angle of inclination of a stabbing flank of one thread is positive in the clockwise direction, the angle being measured with respect to a radial plane perpendicular to the axis of the connection. The angle of inclination of a load flank of a thread is negative in the clockwise direction, the angle being taken with respect to a radial plane perpendicular to the axis of the connection. The angle of inclination of a stabbing flank of the female threaded zone 4 is substantially equal to the angle of inclination of a stabbing flank of the male threaded zone 5. The angle of inclination of a load flank of the female threaded zone 4 is substantially equal to the angle of inclination of a load flank of the male threaded zone 5. The term "inclination of a flank" means either the inclination of a tapered portion of said flank or the inclination of the tangent at a point of inflexion between two radii of curvature.

A thread 40, 50 comprises a crest 41, 51, a root 42, 52, a load flank 43, 53 and a stabbing flank 44, 54. Connection fillets are provided between the flanks and crest and between the flanks and root. The width of the crests 41, 51 and the roots 42, 52 is constant along the axis of the tube. The diameter of the crests 41, 51 and the roots 42, 52 may vary as a function of the position of the corresponding thread along the axis of the tube due to the taper of the threading. The crests 41, 51 and the roots 42, 52 of the threads 40, 50 are parallel to the axis of the threaded connection. This facilitates machining and engagement during threading-up.

The load flank 43 may be inclined at 3° to 15°, preferably 3° to 5° with respect to a radial plane. The load flank 44 may be inclined at 3° to 15°, preferably 3° to 5°, with respect to a radial plane. The stabbing flank 44 may be inclined at 10° to 35°, preferably 15° to 25°. The stabbing flank 54 may be inclined at 10° to 35°. The length of the root 42 may be in the range 0.5 mm to 3 mm. The length of the root 52 may be in the range 0.5 mm to 3 mm. The threads 40 and 50 have a height to lead ratio in the range 3 to 25.

Further, a groove or channel 45 is provided in the base of the load flank 43 of the threads 40. The groove 45 is formed in the extension of the root 42. The groove 45 has a radial dimension in the range 0.11 mm to 2 mm. The groove 45 has an axial dimension in the range 0.1 mm to 1.5 mm. The groove 45 has a generally helical shape. In axial section, the groove 45 comprises a substantially radial bottom 45a, a large diameter edge 45b and a small diameter edge 45c. The small diameter edge 45c is substantially axial or tapered. The large diameter 45b is substantially axial, preferably with the same diameter as the root 42.

Alternatively, the groove is provided in the base of the load flank 53 of the threads 50 and the boss is provided at the crest of the load flank 43 of the threads 40.

The load flank 53 of the threads 50 is provided with a boss 55. The boss 55 is formed in the extension of the crest 51. The boss 55 has a radial dimension in the range 0.1 mm to 1.5 mm in the radial dimension of the threads 50. The boss 55 has an axial dimension in the range 0.1 mm to 1 mm in the axial dimension of the roots 52 of the threads 50. The boss 55 has a generally helical shape. In axial section, the boss 55 comprises a substantially radial surface 55a, a large diameter edge 55b and a small diameter edge 55c. The substantially radial surface 55a can form the free end of the boss 55. The large diameter edge 55b is convex. The small diameter edge 55c is concave. The small diameter edge 45c is substantially axial. The large diameter edge 55b is substantially axial, preferably with the same diameter as the crest 51. The sectional area of the boss 55 may be in the range 0.01 mm² to 3 mm². The boss 55 has a radial dimension of the order of 0.1 mm to 1.5 mm, preferably in the range 0.2 mm to 0.5 mm. The boss 55 has an axial dimension of the order of 0.1 mm to 1 mm, preferably in the range 0.2 mm to 0.5 mm.

The radial height of the boss 55 may be expressed as a fraction of the radial height of the thread, for example in the range 5% to 45%, preferably in the range 10% to 30%. The axial length of the boss 55 may be expressed as a fraction of its radial height, for example in the range 50% to 150%, preferably in the range 80% to 120%.

In the connected state (after makeup), a radial clearance is present between the small diameter edge 45c and the small diameter edge 55c. Said radial clearance may be in the range 0.1 mm to 2 mm.

In the connected state (after makeup), a radial clearance is present between the crests 41 of the threads 40 of the female threaded zone 4 and the roots 52 of the threads 50 of the male threaded zone 5. The radial clearance is of the order of 0.05 mm to 0.5 mm. The choice of radial clearance in the connected state may be guided by the desired volume of grease and the machining tolerances. A clearance of 0.15 mm or less is desirable when the machining quality is high. In the connected state, a radial clearance may be present between the roots 42 of the threads 40 and the crests 51 of the threads 50. The radial clearance is of the order of 0.05 mm to 0.5 mm. Alternatively, an interference of the order of 0 to 1 mm is possible.

Figure 5:
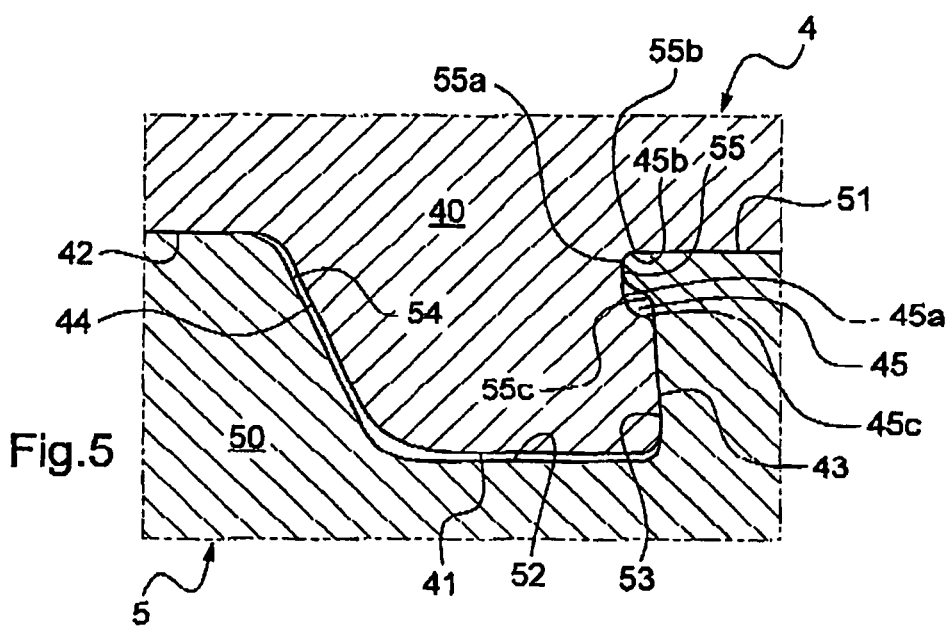

In the connected state (after makeup), an axial clearance, visible in FIGS. 3 to 5, is present between the stabbing flanks 44 and 54 respectively of the threads 40 of the female thread zone 4 and the threads 50 of the male threaded zone 5. The axial clearance is of the order of 0.002 mm to 1 mm. The choice of axial clearance in the connected state may be guided by the desired volume of grease, the angle of the flanks and the machining tolerances. A clearance of 0.5 mm or less is desirable when high quality machining is carried out. The load flanks 43 and 53 take up the interference loads after make-up.

The threadings mutually form radially retaining hooks.

The connecting fillets may be in the range 0.05 mm to 3 mm. The connecting fillets reduce the concentration of stresses at the foot of the load flanks and thus improve the fatigue behaviour of the connection.

In the example of FIG. 3, the angle of the stabbing flanks 44 and 54 is equal to 25°. The angle of the load flanks 43 and 53 is equal to 3°. The radial clearance between the crest 41 and the root 52 is equal to 0.15 mm. The axial clearance between the stabbing flanks 44 and 54 is of the order of 0.5 mm. The radial clearance between the small diameter edge 45c and the small diameter edge 55c is equal to 0.1 mm. The radial dimension of the boss 55 is equal to 0.38 mm. The axial dimension of the boss 55 is equal to 0.35 mm.

In the example of FIGS. 4 and 5, the angle of the stabbing flanks 44 and 54 is in the range 15° to 25°. The angle of the load flanks 43 and 53 is equal, in the range 3° to 5°. The radial clearance between the crest 41 and the root 52 is in the range 0.05 mm to 0.15 mm. The axial clearance between the stabbing flanks 44 and 54 is of the order of 0.5 mm. The radial clearance between the small diameter edge 45c and the small diameter edge 55c is equal to 0.2 mm. The radial dimension of the boss 55 is equal to 0.35 mm. The axial dimension of the boss 55 is equal to 0.35 mm.

In the example of FIG. 5, the small diameter edge 45c of the groove 45 is tapered, preferably at an angle in the range 1° to 30°. The small diameter edge 55c of the boss 55 is tapered, preferably at an angle in the range 10° to 30°. The taper of the small diameter edges 45c and 55c may be equal.

Figure 6:
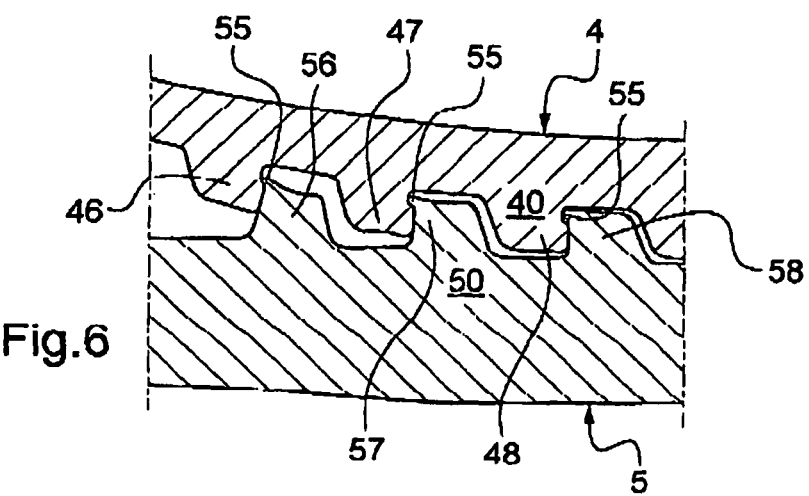
FIG. 6 diagrammatically shows a connection subjected to a high axial load.

FIG. 6 shows a connection which is subjected to high tensile stress. The female end 2 has a tendency to deform outwardly, the enlargement of the diameter being greater as the surface 14 adjacent to the abutment surface 8 at the free end of the female element 2 is approached. The last female thread 46 engaged with a male thread 56 is subjected to a large radial deformation. The groove 45 of the last female thread 46 is in contact with the boss 55 of the male thread 56 with elastic or plastic deformation. The penultimate female thread 47 engaged with the male thread 57 is subjected to a smaller radial deformation. The groove 45 of the penultimate female thread 47 is in contact with the boss 55 of the male thread 57 with a slight elastic deformation. The antepenultimate female thread 48 engaged with a male thread 58 is subjected to a slight radial separation, a radial clearance being conserved between the small diameter edge 45c of the groove 45 of the antepenultimate female thread 48 and the small diameter edge 55c of the boss 55 of the male thread 57. Thus, the third thread 48 from the free end is capable of providing normal mechanical function. The first two threads 47 and 48 reduce the increase in diameter of the female end 2 under the reaction of axial tension. The first two threads 47 and 48 maintain the radial integrity of the connection, preventing the jump-out which would occur with a conventional connection under axial tension.

The female 4 and male 5 threaded zones may constitute multiple-start threads, preferably a dual-start thread. This makes threading-up faster.

In a variation, the stabbing flanks 44 and 54 may have an angle of the order of 0 to −5°.

The connection is well adapted to constituting the internal casing of a well.

The invention is not limited to the examples of connections and tubes described above, solely by way of example, but it encompasses any variations which could be envisaged by the skilled person in the context of the attached claims.

The invention claimed is:

1. A threaded connection used in exploration and operation of hydrocarbon wells, comprising:
    a first and a second tubular component, the first component comprising a male end comprising a threaded zone disposed on its external peripheral surface, the second component comprising a female end comprising a threaded zone disposed on its internal peripheral surface, the threaded zone of the male end being threaded up into the threaded zone of the female end,
    the threaded zones comprising respective male and female threads, the threads comprising a root, a crest, a stabbing flank, and a load flank,
    a groove being provided in the load flank of the threaded zone of the female end and/or the male end respectively, adjacent to the root, and
    a boss being provided which projects axially from the load flank of the threaded zone of the male end and/or respectively from the female end adjacent to the crest, the boss comprising a convex surface and a concave surface, the boss being housed in the groove with, in a connected state, a radial clearance subsisting between the concave surface and the groove and an axial clearance subsisting between the end of the boss and the bottom of the groove.

2. The threaded connection according to claim 1, in which the boss is continuous.

3. The threaded connection according to claim 1, in which the boss is discontinuous.

4. The threaded connection according to claim 1, in which the axial clearance between the end of the boss and the bottom of the groove is in a range 0.011 mm to 2 mm in the connected state.

5. The threaded connection according to claim 1, in which the radial clearance between the concave surface of the boss and the groove is in a range 0.005 mm to 2 mm in the connected state.

6. The threaded connection according to claim 1, in which the threads have a constant axial dimension, an axial clearance subsisting in the connected state between the stabbing flanks of the male and female threads.

7. The threaded connection according to claim 6, in which the axial clearance between the stabbing flanks is in a range 0.05 mm to 1 mm in the connected state.

8. The threaded connection according to claim 1, in which the threads have a variable axial dimension.

9. The threaded connection according to claim 1, in which a radial clearance subsists in the connected state between the crests of the male threads and the roots of the female threads and/or between the crests of the female threads and the roots of the male threads.

10. The threaded connection according to claim 9, in which the radial clearance between the crest of the threaded zone of the female end and the root of the threaded zone of the male end, and/or the radial clearance between the crests of the male threads and the roots of the female threads, is in a range 0.05 mm to 0.5 mm, or is less than 0.2 mm, in the connected state.

11. The threaded connection according to claim 1, in which an interference is present in the connected state between the crests of the male threads and the roots of the female threads or between the crests of the female threads and the roots of the male threads.

12. The threaded connection according to claim 1, in which the stabbing flanks of the threaded zones of the male and female ends comprises a positively inclined rectilinear portion, at an angle in a range 10° to 35°, or in a range 15° to 25°.

13. The threaded connection according to claim 1, in which the load flanks of the threaded zones of the male and female ends comprise a negatively inclined rectilinear portion, at an angle in a range 3° to 15°, or in a range 3° to 5°.

14. The threaded connection according to claim 1, in which the axial length of the boss is in a range 0.1 mm to 1 mm, or in a range 0.2 mm to 0.4 mm.

15. The threaded connection according to claim 1, in which the axial length of the boss is in a range 50% to 150% of radial height of the boss, or in a range 80% to 120%.

16. The threaded connection according to claim 1, in which the radial height of the boss is in a range 0.1 mm to 1.5 mm, or in a range 0.2 mm to 0.5 mm.

17. The threaded connection according to claim 1, in which the radial height of the boss is in a range 5% to 45% of radial height of the thread, or in a range 10% to 30%.

18. The threaded connection according to claim 1, in which the female and male threaded zones are multiple start threads, or dual-start threads.

19. The threaded connection according to claim 1, in which the distal surface of the male end and/or female end is brought into contact in axial abutment against a corresponding abutment surface.

20. The threaded connection according to claim 19, in which the male and female ends each comprises a sealing surface which cooperate with one another by tightening in a metal/metal seal.

* * * * *